United States Patent [19]

Horwitt

[11] Patent Number: 4,583,277

[45] Date of Patent: Apr. 22, 1986

[54] METHOD UTILIZING A CIGAR LIGHTER SOCKET SHELL DRIVER TOOL

[75] Inventor: Laurence G. Horwitt, Dania, Fla.

[73] Assignee: Casco Products Corporation, Bridgeport, Conn.

[21] Appl. No.: 685,730

[22] Filed: Dec. 24, 1984

Related U.S. Application Data

[62] Division of Ser. No. 478,793, Mar. 25, 1983, Pat. No. 4,497,226.

[51] Int. Cl.$^4$ ...................... B21D 39/04; B21D 39/06; B23P 11/00

[52] U.S. Cl. ..................................... 29/456; 29/240.5; 29/559; 219/267

[58] Field of Search ...................... 29/456, 559, 240.5; 81/473, 474, 125; 192/56 R; 219/260, 267

[56] References Cited

U.S. PATENT DOCUMENTS

| | | | |
|---|---|---|---|
| 1,854,116 | 4/1932 | De Schebeko | 81/125 X |
| 2,113,535 | 4/1938 | Cuno et al. | 219/267 X |
| 2,184,694 | 12/1939 | Cohen | 219/260 |
| 2,236,483 | 3/1941 | Bahr | 219/267 X |
| 2,316,231 | 4/1943 | Evans | 29/456 |
| 3,376,765 | 4/1968 | Ruby | 81/125 X |
| 3,424,414 | 1/1969 | Horwitt | 219/267 X |
| 3,579,793 | 5/1971 | Williams et al. | 29/240.5 |
| 4,172,314 | 10/1979 | Berecz et al. | 29/240.5 |

*Primary Examiner*—Mark Rosenbaum
*Assistant Examiner*—Ronald S. Wallace
*Attorney, Agent, or Firm*—Mitchell Bittman

[57] ABSTRACT

A tool bit for facilitating the application of a cigar lighter socket to an apertured mounting plate in an automobile, comprising a driving member having a shank receivable in the chuck of a power tool, and a separate shouldered plug member carried by the driving member and having a portion receivable in the mouth of the cigar lighter socket for the purpose of rotatably driving the same. Threads at the rear of the socket are screwed into mating threads of a clamping shell which is usually hand-held at the rear of the panel. The driving member and plug member can rotate with respect to one another against the action of a spring-charged clutch or detent on the members. When the plug member is inserted into the socket mouth it becomes keyed to the socket and effects a rotation of the same as power is applied to the driving member. When the desired torque is reached, the clutch slips, thereby insuring against overtightening and possible damage to the parts. The shoulder on the plug member prevents it from contacting the bimetal fingers which are deep in the socket, thereby eliminating inadvertent bending and malfunction of the same.

4 Claims, 9 Drawing Figures

METHOD UTILIZING A CIGAR LIGHTER SOCKET SHELL DRIVER TOOL

This is a division of application Ser. No. 478,793, filed 3/25/83, now U.S. Pat. No. 4,497,226, issued 3/25/85.

BACKGROUND

This invention relates generally to automotive electric cigar lighter devices, and more particularly to a tool for facilitating the installation of such devices in the automobile dashboard, or at other locations in the vehicle.

In the past a number of arrangements have been devised for securing cigar lighter assemblages to a dashboard, and also more recently in the arm rests of some of the later vehicles. Typically such cigar lighter devices involve a removable ignitor plug which is stored in a socket or well, the latter having two or more bimetallic fingers which are adapted to latch over a heating element cup on the ignitor plug when the latter is depressed, thereby completing a circuit through the heating element carried in the cup. After a short time interval, typically 10–15 seconds, the bimetal fingers sprung outwardly under the influence of the heating of the coil, releasing the ignitor plug for partial ejection and indicating thereby to the user that the plug was ready for removal and use.

The employment of bimetallic fingers in cigar lighters has won wide acceptance over the years, and many different cigar lighter designs have been proposed and produced, as indicated by the great number of patents taken out. The reliability of bimetallic fingers is excellent in this use, even over extended periods of time involving thousands of repeated operations. It is considered very important that the positioning of these fingers be just right so as to provide the proper latching function, while at the same time enabling proper release of the heating element cup of the ignitor plug so as to provide adequate incandescence without danger of burnout.

Accordingly, great care is exercised in the positioning of the fingers when they are installed in the socket or well of the cigar lighter during manufacture. Similarly, during installation of the socket in the dashboard or other panel of the vehicle where the lighter is to be located, it is important that the initial positioning of the fingers not be disturbed in the least, since any undesirable bending could conceivably lead to malfunctioning of the lighter, or else cause other problems as when one of the bimetal fingers is bent into the path of the ignitor plug for improper contact therewith as the latter is depressed. Under such circumstance, there is the possibility of blown fuses or burned out wiring harnesses, and at the very least, permanent damage to the lighter assembly, necessitating replacement.

Generally cigar lighter sockets have a threaded thimble portion at the inner end, which is adapted to mate with a correspondingly threaded portion of a larger-diameter clamping shell having a similarly threaded end portion. The socket has an out-turned curl or flange which engages the front surface of the panel to which it is secured, and the clamping shell is applied from the rear, with the forward edge of the shell being intended to engage the rear surface of the vehicle panel. Over the years, such an arrangement has been found to be very satisfactory from the standpoint of economy of installation and ease of replacement, and has won wide acceptance in the automotive field.

In many instances, installation was accomplished by hand. One hand was employed to hold the socket in position from the front of the dashboard, with the other employed to impart turning movement to the clamping shell so that the cooperable threads of the two parts would engage. Then the shell was tightened by hand the proper amount to adequately secure the socket in position. In certain circumstances, particularly in the case of newer automobiles, access to the rear of the panel is usually difficult to achieve, mainly due to the large number of additional accessories that are being offered. Where a tool of some sort was employed in the past to grasp the socket, the bimetallic fingers sometimes became sprung, especially with constructions where openings were stamped out in the sides of the socket and shell, to function for ventilation. Even where the socket was merely grasped by the fingers, there existed the danger that the bimetallic strips could be bent, possibly jeopardizing the proper operation of the device following installation.

Attempts to employ different tools of one sort or another in order to turn the socket from the front, through the mouth opening which receives the ignitor plug, often resulted in similar danger or damage to the bimetallic fingers. Moreover, in constructions employing lanced spring fingers in the socket, which were employed to bias the ignitor plug to a predetermined position, the adjustment of such fingers was also fairly critical, and damage represented a needless waste.

SUMMARY

The above disadvantages and drawbacks of prior methods and tools for effecting installation of cigar lighters in automobile panels are largely obviated by the present invention which has for one object the provision of a novel and improved installation tool bit which is extremely simple, easy to use, and at the same time provides a high degree of reliability and safety from possible damage to the parts being installed.

A related object of the invention is to provide an improved cigar lighter installation tool bit as above set forth, wherein precisely the correct amount of torque is applied between the clamping shell and the socket of the cigar lighter, and wherein the torque is applied in such a manner that there is little or no danger of damage occurring to the various parts of the cigar lighter, which would otherwise jeopardize the proper functioning of the unit following its installation or after a period of use.

Another object of the invention is to provide an improved tool bit as above characterized, wherein the operation is especially simple and does not require the use of skilled labor.

Still another object of the invention is to provide an improved tool bit of the kind indicated, wherein the parts making up the unit are relatively simple in construction, and wherein little or no assembly or disassembly of the parts are required during the use of the device.

A still further object of the invention is to provide an improved tool bit as outlined above, wherein there is virtually eliminated any possible damage to the bimental fingers of the socket of the cigar lighter during installation, either through inadvertent bending or breakage, and at the same time there is no possibility of damage to the lanced spring fingers of the socket, thus preserving the overall reliability of the device by not upsetting the critical parameters that have been carefully set at the factory.

Yet another object of the invention is to provide an improved tool bit in accordance with the above, wherein no judgement on the part of the operator is required in effecting proper installation of the cigar lighter socket, since there is no need for interpretation of tolerances, or reliance on judgement of turning forces during assembly. Thus the element of human error is greatly minimized in the present construction.

The above objects are accomplished by a tool bit for use with a power tool, to effect the assemblage of the cigar lighter socket to the clamping shell, comprising a driving member having a shank receivable in the chuck of the power tool to effect a rotary drive of the member, and a separate plug member carried by the driving member, together with means providing a bearing between the members to enable them to rotate with respect to one another. The plug member has a portion receivable in the cigar lighter socket, and a shoulder for engagement with an out-turned flange of the socket to limit the degree of insertion. Keying means are provided on the plug member, engageable with the cigar lighter socket to turnably drive the latter while the clamping shell is being held stationary. There are also cooperable drive means on the members, providing a slip clutch which is made operative to yield in response to application of a predetermined torque. This insures the assembling of the socket to the clamping shell with a predetermined, desired degree of tightness so as to avoid overstressing of either the socket or clamping shell, and undesirable distortion or breakage of the parts.

The above objects are further accomplished by a unique method of assembling the socket for a cigar lighter igniting unit to its clamping shell, the socket being of the type having an out-turned flange for engagement with an apertured mounting plate in an automobile, and having screw threads at its inner end, and the clamping shell having at one end cooperable screw threads adapted to mate with the screw threads of the socket, and at its other end an abutment edge adapted to engage the rear surface of the mounting plate. The method employs a power tool and a tool bit comprising a drive member having means receivable in the chuck of the power tool to effect a rotary drive of the member, and a plug member carried by the drive member. A bearing between the members enables them to rotate with respect to one another, and the plug member has a portion receivable in the socket and a shoulder for engagement with the out-turned flange of the socket to limit the degree of insertion. The plug member also has means that are engageable with the socket to turnably drive it while the clamping shell is being held, and the tool bit has a slip clutch made operative in response to application of a predetermined torque thereto. The method comprises the steps of inserting the tool bit into the chuck of the power tool and tightening the chuck, inserting the socket of the cigar lighter through the aperture of the mounting plate of the automobile, and positioning the clamping shell on the other side of the plate so that the threads of the socket and shell become engaged. Thereafter the tool bit is inserted into the mouth of the socket until the shoulder of the plug member engages the flange of the socket. The plug member can be initially rotated slightly with respect to the socket so as to key the plug member thereto, and form a unitary drive assemblage therewith. While the clamping shell is held against rotation, the power tool is energized so as to rotate the socket and advance the threads thereof into the clamping shell threads until the plug member and socket cease to have relative turning with respect to the clamping shell. Thereafter the tool bit is merely withdrawn from the cigar lighter socket.

The above arrangement has the following advantages, which are not revealed in the prior art. The plug member can be economically made essentially in the form of a simple shouldered cylinder which closely slidably fits into the mouth of the socket. The shoulder of the cylinder prevents it from extending into the socket to a point where it could inadvertently come into contact with the bimetal parts, and thus there is never any danger of deformation of these parts during installation.

The shoulder on the plug member is preferably circular in its configuration, and constitutes a positive stop and positioning means for the tool bit when it is being used to turnably drive the socket. No judgement is required on the part of the operator as to how deeply to position the bit in order to effect the installation. Nor is it likely for the operator to inadvertently damage the socket by improper positioning of the bit therein. The device is thus seen to be virtually foolproof.

As soon as the desired torque has been achieved between the socket and clamping shell, the clutch in the bit takes over, insuring against overtightening and possible deformation or damage to the various parts of the cigar lighter. Since the clutch is pre-adjusted and disposed wholly within the tool bit itself as against being accessible at the power tool, there is no possibility of error on the part of the installer, as for example by employing an incorrect setting of the clutch. In this connection it is noted that overtightening of the clamping shell could in all likelihood result in damage occurring to the cigar lighter device, possibly necessitating replacement.

Installation of the socket device is thus greatly simplified and speeded up, since no special tools are involved in holding the clamping shell at the rear of the panel. This operation is now preferably accomplished with one hand, the other hand being employed to operate the power tool.

Accordingly the present construction is seen to represent a distinct advance and improvement in the art of installing cigar lighter devices.

In the drawings, illustrating a preferred embodiment of the invention and showing various steps in the method involved with the invention:

Figure 2:
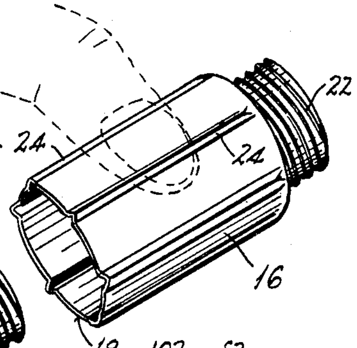
FIG. 2 is a perspective view, particularly illustrating the tool of FIG. 1 secured to the chuck of a drive mechanism, shown in dotted outline, and illustrating a panel of an automobile having the socket of a cigar lighter inserted from the front of the panel while the clamping shell for the socket is being manually held at the rear of the panel, just prior to the installation.
Figure 2:
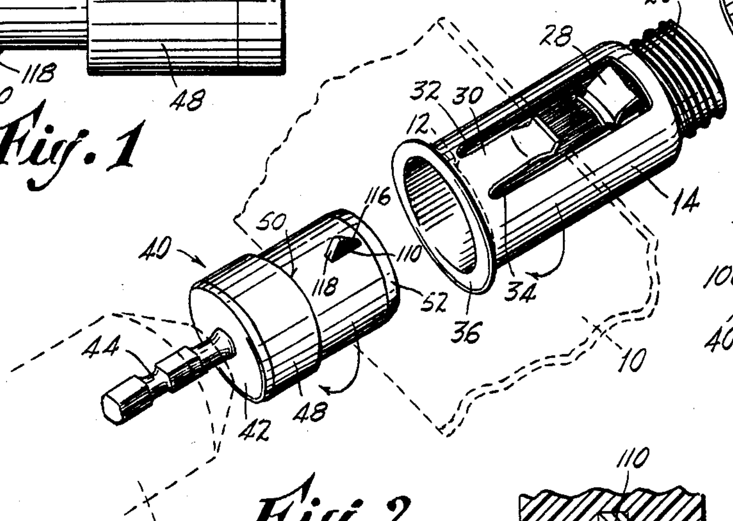

Referring first to FIG. 2, there is illustrated in dotted outline, an automobile panel which may be a dashboard or a panel of the type found in recessed wells in the armrests of the vehicle or in ashtray assemblies having integral cigar lighter devices disposed therein. The panel as shown is generally designated by the numeral 10 and has a circular hold 12 which is adapted to receive the socket 14 of an electric cigar lighter. In the interest of simplicity, the ignitor plug of the cigar lighter device is not shown in the figures, since this forms no part of the present invention. It may be of conventional design, similar to that illustrated in many prior U.S. Patents.

The cigar lighter socket 14 is normally secured in position by means of a thin metal clamping shell 16 which is disposed at the rear of the panel 10 and which has a circular front edge 18 adapted to engage the rear surface of the panel 10 in a well-known manner. Assembly of the socket 14 to the panel 10 was previously accomplished by inserting it into the hole 12, and thereafter screwing the clamping shell 16 in place. The socket 14 has a threaded portion 20 at its inner end, and the shell 16 has a cooperable threaded portion 22 which is intended to mate with the threads 20. The clamping shell may optionally be provided with a series of stiffening or strengthening ribs 24, as well as one or more stamped out clearance openings for purposes of ventilation, internal lighting of the socket, etc.

As illustrated in FIG. 2, the base of the socket or well 14 is conventionally provided with bimetallic spring fingers, usually two in number, but other constructions involving three have been proposed and produced in the past. One such finger is shown in the figure, labelled 28. Fingers such as that indicated 28 are intended to grip the metal heating element cup (not shown) of the ignitor plug when the latter is inserted in the socket and depressed. The electrical contact through the heating element, which is disposed in the metal cup (not shown), is established by the engagement of the bimetallic fingers 28 with the exterior surface of the cup.

As also illustrated in the figure, the side wall of the socket 14 is provided with lanced spring fingers 30, which together with other adjacent portions of the cylindrical wall of the socket form two slots 32, 34. The purpose of the spring fingers 30 is to impose a holding force on the ignitor plug when it is stored in the socket. Most of the newer cigar lighters being produced today incorporate some type of spring finger such as shown at 30, and an identical finger is disposed on the diametrically opposite wall of the socket in FIG. 2 but is not visible in this view. The front edge of the socket 14 has a curled over rim 36 providing a flange which engages the front surface of the panel 10 when the socket is fully mounted. In some of the appended claims, this curled-over portion is referred to as an out-turned flange. Since this flange covers the outlines of the hole 12 in the panel, a clean or finished appearance is imparted to the installation thereby, following assembly.

Figure 1:
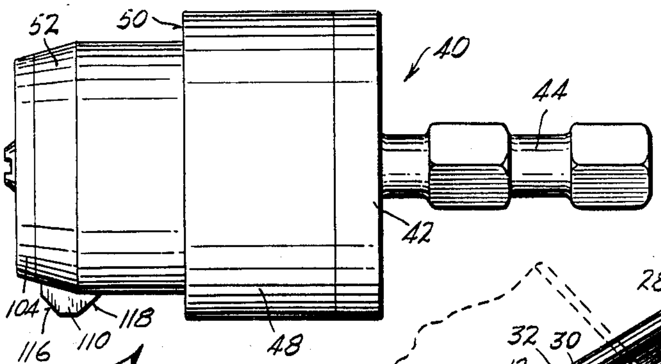
FIG. 1 is a side elevation of the improved socket drive tool bit of the present invention.

In accordance with the present invention there is provided a novel and improved tool bit for quickly and effectively assembling the cigar lighter socket 14 to its clamping shell 16 in such a manner that there is little or no possibility of damage occurring to the bimetal parts of the socket, and wherein judgement is not required on the part of the installer as to how much torque to exert on the relative parts in order to achieve the desired degree of tightness. The tool bit is particularly illustrated in its assembled condition in FIGS. 1-3, and is generally designated by the numeral 40, comprising a driving member 42 which can be essentially in the form of a plate or disk, having a shank 44 by which the bit is held in the chuck 46 of a power tool (not shown). The driving member 42 is preferably constituted of steel. Associated with the driving member 42 and coaxial therewith is a plug member 48 which is preferably of plastic or nylon construction, and is generally cylindrical in shape. The plug member 48 has a stop shoulder 50, and the dimensions of the portion to the right of the shoulder 50 in FIG. 1 are such that that the shoulder 50 can butt against the out-turned curl or flange 36 of the cigar lighter socket 14 when the tool bit 40 is inserted therein. The plug member 48 optionally has a tapered nose 52 in order to facilitate the insertion of the bit into the mouth or opening of the socket 14.

Figure 3:
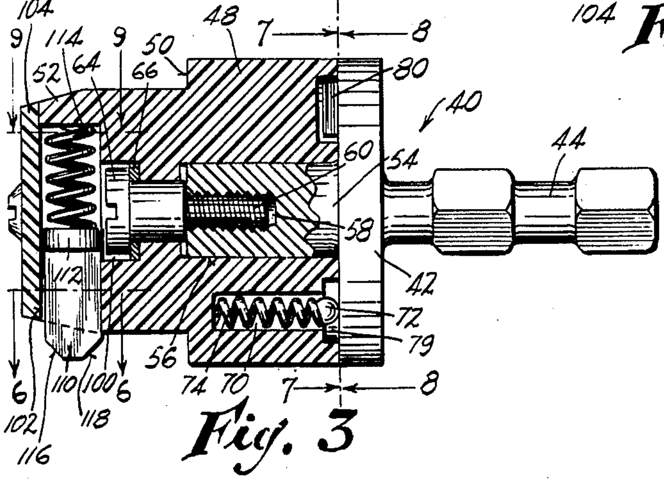
FIG. 3 is a view, partly in side elevation, and partly in vertical section showing various details of the construction of the plug member and drive member portions of the tool bit.
Figure 4:
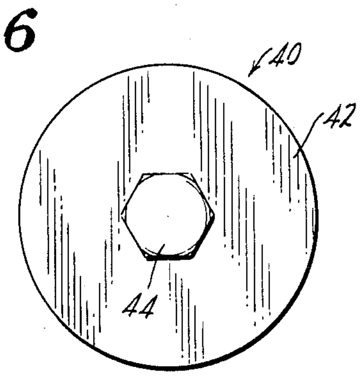
FIG. 4 is a top plan view of the tool bit of FIG. 1.

Integral with the driving member 42 is an axial bearing post 54, FIG. 3, which is received in a corresponding axial bore or hole 56 of the plug member 48. The bearing post 54 has a central aperture 58 which is threaded as shown, and carries a headed screw 60. The head of the screw is indicated at 64, and there is a bearing or thrust washer 66 disposed under the head of the screw 60.

Figure 8:
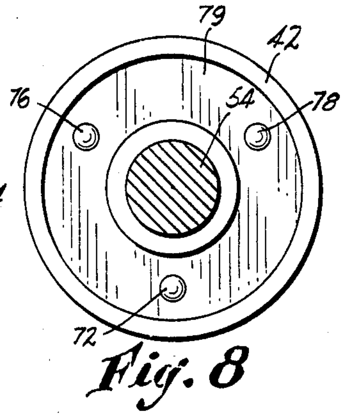
FIG. 8 is a section taken on the line 8—8 of FIG. 3.
Figure 9:
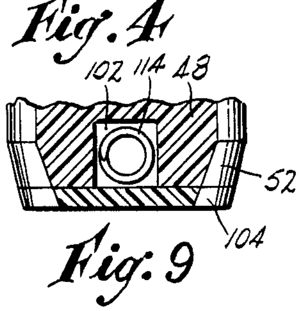
FIG. 9 is a section taken on the line 9—9 of FIG. 3.

Referring now to FIGS. 3 and 8 and in accordance with the present invention the plug member 48 has a series of axial bores which are parallel to the axis of the member, one of the bores being shown in FIG. 3 and being indicated by the numeral 70. The bore 70 carries a spring-charged plunger or yieldable projection in the form of a ball detent 72 and spring 74. The diameter of the spring 74 is such that it is closely confined by the walls of the recess, and small enough to form a seat for the ball 72. FIG. 8 shows three such ball detents, indicated 72, 76 and 78, these being circumferentially spaced from one another by 120 degrees and projecting into an annular recess 79 in the end face of the plug member 48. In the case where three ball detents are employed, spaced 120 degrees apart, a balanced force is experienced between the driving member 42 and the plug member 48, resulting in a desired smoothness of operation. The washer 66 also receives a balanced force from the ball detents, in such a case.

Figure 7:
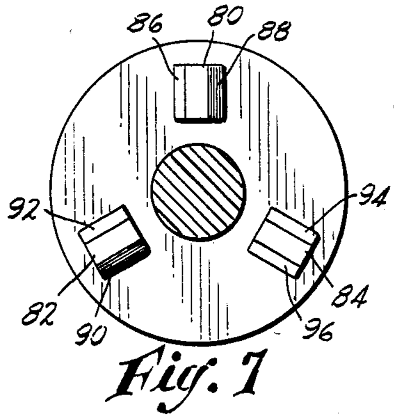
FIG. 7 is a section taken on the line 7—7 of FIG. 3.

Referring now to FIG. 7, it can be seen that one surface of the driving member 42 defines a generally arcuate or circular track in which there are disposed three upstanding fixed projections or abutments 80, 82 and 84. The circular track that is defined would be that formed by drawing two concentric circles about the axis of the member, one circle passing through the outermost portion of the projections, and the other circle passing through the innermost portions thereof. The projections 8084 all lie in the paths of the balls when the driving member 42 is rotatably driven with respect to the plug member 48. Each of the projections 80–84 has camming faces on both sides, designated 86, 88; 90, 92; and 94, 96 respectively. The camming faces cooperate with the balls 72, 76 and 78 in order to insure a smooth transition of the balls along the track as they ride up to elevated positions on the crests of the projections 80, 82 and 84 as will be explained below. Together, the ball detents and projections form a slip clutch between the driving member 42 and the plug member 48. The track mentioned above can be thought of as having different elevations, one elevation being that defined by the projections, and another being the remaining flat areas, which are of larger expanse. In place of the projections that are shown, the track could be provided with spaced recesses, if desired, to constitute the clutch.

Figure 5:
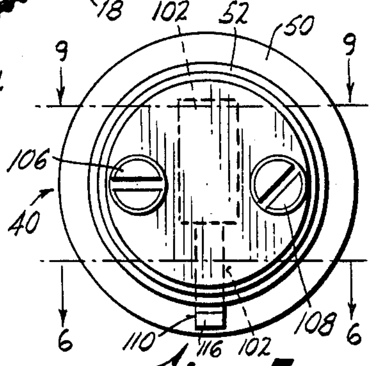
FIG. 5 is a bottom plan view of the tool bit of FIG. 1
Figure 6:
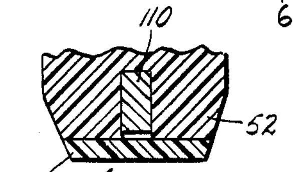
FIG. 6 is a section taken on the line 6—6 of FIG. 5.

Referring again to FIG. 3, it can be seen that the plug member 48 has a circular recess 100 into which the head 64 of the screw 60 is received, and in addition a transverse slot 102 is provided, formed partially by a second recess in the plug member, and partially by a cover plate 104 which is secured by two screws 106 and 108, FIG. 5. The head 64 of the screw is normally inaccessible during use of the tool, by virtue of the cover plate. The slot 102 receives a laterally directed, retractable key or keying member in the form of a plunger, designated 110, the keying member having a thin skank which is of non-circular cross section. The slot 102 is also of non-circular cross section, whereby the keying member cannot rotate in the slot. The member 110 extends transversely past the head 64 of the retaining screw, and is preferably of rectangular cross section, as shown in FIG. 6. It has an enlarged head 112 which constitutes a seat for a spring 114 that is also carried in the slot 102. The outer end of the keying member 110 has a nose portion with oppositely disposed camming faces 116, 118, which facilitate the retracting movement of the member as the tool bit is inserted in or removed from the socket 14 of the cigar lighter device, as will be explained.

For the installation, the clamping shell 16 can be held by the installer with one hand behind the dashboard or panel 10 in line with the hole 12, and the socket 14 inserted through the hole so that the threads 20 and 22 are adjacent one another. Optionally these threads could be manually initially "started", after which the tool bit 40 is inserted into the mouth of the socket 14 with the keying member 110 retracting under the action of the inserting movement. The diameter of the portion of the plug member 48 adjacent the keying member is just slightly less than the inner diameter of the socket 14. As the plug member is being inserted, it can be turned slightly if need be, such that the keying member 110 snaps into one of the slots 32, 34 or into corresponding slots on the other side of the socket, (not shown in FIG. 1 since they are behind the front wall of the socket.) The degree of insertion of the plug member 48 is positively limited by the engagement of the shoulder 50, FIG. 1, with the out-turned curl 36 of the socket 14. Upon initial energization of the tool (chuck 46) the socket 14 will be turnably driven by the plug member 48 due to the restraint provided by the ball detents and cooperable projections, while the clamping shell 16 is being manually held. When the desired degree of torque has been reached, yielding of the plug member 48 occurs with respect to the driving member 42; that is, the clutch formed by the ball detents 72, 76 and 78 and the projections 80, 82 and 84 will begin to slip. The direction of rotation of the driving member 42 is such that the leading camming faces 86, 90 and 94 provide a relatively smooth transition for the corresponding balls as they ride over the projections, and the trailing camming faces 88, 92 and 96 similarly improve the transition of the balls from the crests of the projections to the flat, remaining areas of the circular track mentioned above. Following the operation of the clutch, the power tool can be stopped and the tool bit 40 removed from the assembled socket 14 by merely applying a moderate pulling force in an axially outward direction, sufficient to cause retraction of the keying member 110 from the socket slot that it occupied. The assembly of the cigar lighter socket and clamping shell is then complete.

It is important to note that in the above steps, there was little or no occasion to handle or otherwise tamper with the bimetal fingers 28, thus minimizing the possibility of inadvertent damage thereto. As noted above, they are adjusted at the factory, and their initial positioning is fairly critical. The smaller-diameter portion of the plug member is sufficiently short that it does not extend an appreciable extent into the socket, and therefore does not come into contact with the bimetal fingers. Due to the relatively simple configuration of the keying member, practically any type of stamped socket can be employed with the tool bit of the present invention, since all that is necessary is for the socket to have an aperture at a location suitable to receive the keying member when the plug member is inserted through the mouth of the socket. Most commercially available cigar lighter devices have such configurations, and are thus adaptable for use with the present invention. The device that is disclosed herein thus solves a number of problems which existed in prior arrangements for installation of cigar lighter sockets, and represents a distinct advance and improvement in this field of technology.

The present invention also embraces the novel method for installing the cigar lighter socket, the steps being illustrated generally in FIG. 2. Basically the method involves the inserting of the socket of the cigar lighter device through the aperture 12 of the mounting plate or dashboard 10 of the automobile, the positioning of the clamping shell 16 on the other side of the plate so that the threads 20 of the socket are adjacent the threads 22 of the shell, and optionally the manual starting of the threads, if desired. The installer inserts the tool bit 40 of the present invention into the chunk 46 and tightens it, if this has not been previously done. Thereafter the tool bit is inserted into the mouth of the socket 14, during which the keying member 110 is forcibly retracted by its engagement with the out-turned curl 36 of the socket or engagement with the inner surface of the socket wall. The installer now holds the clamping shell 16 against rotation, and energizes the power tool so that the socket 14 is turned and the clamping shell 16 thus tightened thereon until a predetermined torque between the shell 16 and socket 14 has been reached, that is, until the plug member 48 and socket 14 cease to have relative turning movement with respect to the clamping shell 16. Thereafter the tool bit 40 is withdrawn from the mouth of the socket 14. During the insertion of the tool bit into the socket, it may be necessary to rotate the bit by a slight amount in order to align the keying member 110 with one of the slots or apertures 32, 34 in the side wall of the socket, such that the key can snap into the said aperture, to its normal advanced position, whereby the socket 14 is keyed to the plug member 48.

The tool bit of the present invention is also particularly well adapted for use on automobile assembly lines where the operator's movements can be supplemented to effect considerably easier work load functioning. It is common practice on such assembly lines for power tools to be suspended from overhead positions conveniently accessible to the work area. The operator or assembly worker can readily reach up and grasp the power tool with one hand, apply it to the designated assembly operation, and when finished, merely let go and allow it to retract to its original overhead position. With the present arrangement, such a worker can utilize a power tool having affixed in its chuck the present tool bit, then place the cigar lighter socket on the bit without being concerned about its orientation. With the same hand he can now insert the tool bit and captive cigar lighter socket into the hole, and with the other hand hold the clamping shell in position. Due to the design of the spring loaded member 110, the socket is securely retained as the drive tool is manipulated. Simplified operation results because the keying member 110 automatically snaps into one of the cigar lighter socket slots without requiring special attention from the worker.

It is also significant to note that in the present construction wherein the torque applied to the socket is automatically predetermined by the stiffness of the springs carried inside the tool bit, there exists little or no possibility of damage occuring to the panels into which the sockets are being inserted. This is especially important where special decorative bezels or plastic panels are being employed, as with current model vehicles. Problems with insufficient torque are also similarly avoided.

From the above it can be seen that I have provided an improved tool for installation of cigar lighter devices in automobiles, the tool being simple in construction, and obviating a great many of the problems previously encountered by personnel involved in accomplishing such tasks. The construction of the device is straightforward, and assembly of the tool can be easily done without the need for special fixtures or the like.

Each and every one of the appended claims defines a distinct aspect of the invention which is separate from all others, and accordingly each claim is to be treated in this manner when examined in the light of the prior art in any determination of novelty or validity.

Variations and modifications are possible without departing from the spirit of the invention.

I claim:

1. The method of assembling the socket for a cigar lighter igniting unit to the clamping shell therefor, said socket being of the type having an out-turned flange for engagement with an apertured mounting plate in an automobile, and having screw threads at its inner end, and said clamping shell having at one end cooperable screw threads adapted to mate with the screw threads of the socket, and at its other end an abutment shoulder adapted to engage the rear surface of the mounting plate, said method employing a power tool and a tool bit comprising a drive member having means receivable in the chuck of the power tool to effect a rotary drive of the member, and further comprising a plug member carried by the drive member, a bearing between the members to enable them to rotate with respect to one another, and wherein the plug member has a portion receivable in the socket and a shoulder for engagement with the out-turned flange of the socket to limit the degree of insertion thereof into the socket, the plug member having means that are engageable with the socket so as to turnably drive the latter while the clamping shell is being held, and the tool bit having a slip clutch made operative in response to application of a predetermined torque thereto, comprising the steps of:

(a) inserting the tool bit into the chuck of the power tool and tightening said chuck,
(b) inserting the socket of the cigar lighter through the aperture of the mounting plate of the automobile, and positioning the clamping shell on the other side of the plate so that the threads of the socket and shell become engaged,
(c) inserting the tool bit into the mouth of the socket until the shoulder of the plug member engages the flange of the socket,
(d) locking the plug member of the bit to the socket of the cigar lighter against relative rotary movement so as to form a unitary drive assemblage therewith,
(e) holding the clamping shell against rotation,
(f) energizing the power tool so as to rotate the socket and advance the threads thereof into the clamping shell threads until the plug member and socket cease to have relative turning with respect to the clamping shell, and
(g) thereafter withdrawing the tool bit from the cigar lighter socket.

2. The invention as set forth in claim 1, wherein the plug member has an advanceable and retractable key disposed laterally of the axis of rotation of the drive and plug members, and including the further step of:

(a) forcibly retracting the key as the plug member is inserted into the socket of the cigar lighter, during engagement of said key with the out-turned flange of the said socket.

3. The invention as set forth in claim 2, wherein the cigar lighter socket has an aperture, and including the further step of positioning the retractable key in such a way that it can snap to its advanced position into the aperture whereby the plug member is keyed to the cigar lighter socket to enable simultaneous rotation of the plug member and socket as a unit.

4. The method of assembling the socket for a cigar lighter igniting unit to the clamping shell therefor, said socket being of the type having an out-turned flange for engagement with an apertured mounting plate in an automobile, and having screw threads at its inner end, and said clamping shell having at one end cooperable screw threads adapted to mate with the screw threads of the socket, and at its other end an abutment shoulder adapted to engage the rear surface of the mounting plate, said method employing a power tool and a tool bit comprising a drive member having means receivable in the chuck of the power tool to effect a rotary drive of the member, and further comprising a plug member carried by the drive member, a bearing between the members to enable them to rotate with respect to one another, and wherein the plug member has a portion receivable in the socket and a shoulder for engagement with the out-turned flange of the socket to limit the degree of insertion thereof into the socket, the plug member having means that are engageable with the socket so as to turnably drive the latter while the clamping shell is being held, and the tool bit having a slip clutch made operative in response to application of a predetermined torque thereto, comprising the steps of:

(a) inserting the tool bit into the chunk of the power tool and tightening said chuck,
(b) applying the cigar lighter socket to the tool bit, to be carried thereby, with the shoulder of the plug member engaging the flange of the socket,
(c) inserting the carried socket through the aperture of the mounting plate of the automobile, and positioning the clamping shell on the other side of the plate so that the threads of the socket and shell become engaged,
(d) locking the plug member of the bit to the socket of the cigar lighter against relative rotary movement so as to form a unitary drive assemblage therewith,
(e) holding the clamping shell against rotation,
(f) energizing the power tool so as to rotate the socket and advance the threads thereof into the clamping shell threads until the plug member and socket cease to have relative turning with respect to the clamping shell, and
(g) thereafter withdrawing the tool bit from the cigar lighter socket.

* * * * *